United States Patent Office 3,051,050
Patented Aug. 28, 1962

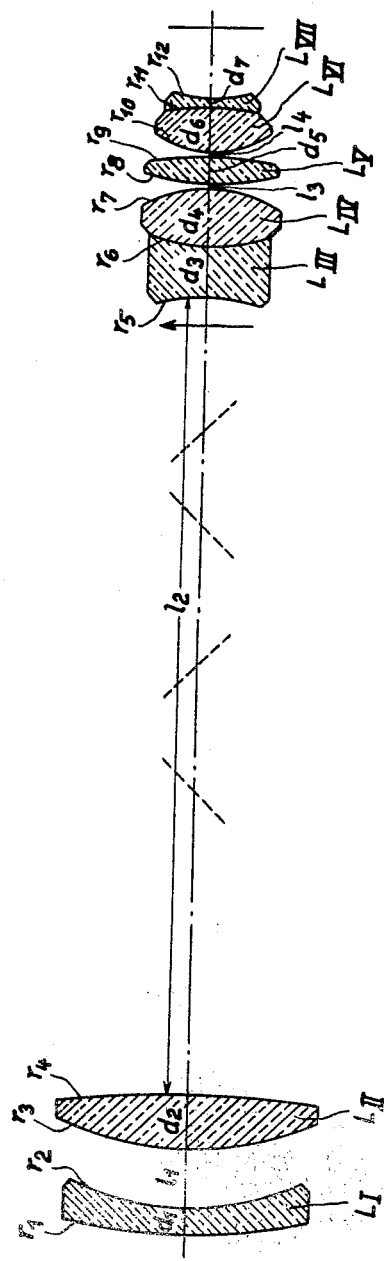

3,051,050
BINOCULAR LENS SYSTEM
Horst Kohler, Heidenheim (Brenz), Germany, assignor to Carl Zeiss, Heidenheim (Brenz), Wurttemberg, Germany
Filed Apr. 30, 1959, Ser. No. 810,183
Claims priority, application Germany May 2, 1958
1 Claim. (Cl. 88—57)

Most binocular eyepieces of prior art if they are to have good correction of the aberrations of definition (astigmatism and coma) over a fairly large field show chromatic difference of magnification of considerable amount. This statement is particularly true of eyepieces of the Erfle type i.e. of eyepieces in which cemented doublet outside members with plane external surfaces stand on either side of a simple collective lens and of eyepieces which use deeply bent menisci as they are found as a rule in modern binoculars. The application of such eyepieces to modern wide-angle binoculars was possible principally because the binoculars contained prismatic erecting systems. The prisms in conjunction with the objectives produce, as is well known, the negative chromatic difference of magnification which largely compensates that of the eyepieces.

If a wide-angle eyepiece is used in a telescope without a prismatic erecting system or if in a wide-angle binocular the image erection is to be produced by surface mirrors then the said compensation does no longer occur. One is therefore obliged either to accept a noticeable chromatic difference of magnification or to reduce the field of view or to use eyepiece types which do not possess the said chromatic difference of magnification but which show much worse marginal definition. This disadvantage can be avoided according to the present invention in that in a telescope with collective eyepieces preferably in a binocular with an erecting system consisting of surface mirrors and with eyepieces with angular image field of more than $\pm 25°$ measured against the axis on the side of the eye objectives are used which consist of two lenses of opposing refractive powers separated by an air space of which the dispersive lens stands in the first place seen in the direction of the light and which are separated by a meniscus-shaped air lens which turns its concave side towards the image plane and whose axial thickness lies between 3% and 10% of the focal length, and wherein for the dispersive lens a glass is chosen whose Abbe-$\nu$ number is for an amount of at least 20 lower than that of the collective lens.

The effect of combining objectives of the above prescribed kind with wide-angle eyepieces in telescopes and binoculars, in the absence of image inverting glass prisms is, according to the invention, to initiate through such an objective a negative chromatic difference of magnification which allows to compensate the chromatic difference of magnification of the said wide-angle eyepiece in the same measure as is otherwise effected by the cemented achromatic doublets of prior art used as objectives in conjunction with prismatic erecting system of prior art.

In the appended illustration one embodiment of a binocular of 8× magnification constructed according to the numerical values of the following table according to the invention. The numerical values refer to an objective focal length of 150 units of length.

In the table and in the drawing these designate:

L, the individual lenses,
r, the radii,
d, the lens thicknesses,
l, the air spaces,
$n_d$, the refractive indices, and
$\nu_d$, the Abbe numbers of the glass types.

In the illustration the position of surface mirrors is schematically represented by dashed lines which take the places of the reflecting prism surfaces in the case that the binocular is constructed as a mirror binocular.

Table

| Lenses | Radii | Thickness and Separations | $n_d$ | $\nu_d$ |
|---|---|---|---|---|
| $L_I$ | $r_1=+102.92$ | $d_1=5.3$ | 1.7283 | 28.34 |
|  | $r_2=+50.845$ | $l_1=12.4$ |  |  |
|  | $r_3=+61.748$ |  |  |  |
| $L_{II}$ |  | $d_2=10.5$ | 1.6031 | 60.68 |
|  | $r_4=-195.9$ | $l_2=162.13$ |  |  |
|  | $r_5=-35.996$ |  |  |  |
| $L_{III}$ |  | $d_3=10.4$ | 1.7174 | 29.51 |
|  | $r_6=+33.018$ |  |  |  |
| $L_{IV}$ |  | $d_4=11.5$ | 1.6204 | 60.29 |
|  | $r_7=-26.227$ | $l_3=0.2$ |  |  |
|  | $r_8=+46.639$ |  |  |  |
| $L_V$ |  | $d_5=5.3$ | 1.6204 | 60.29 |
|  | $r_9=-68.786$ | $l_4=0.2$ |  |  |
|  | $r_{10}=+19.953$ |  |  |  |
| $L_{VI}$ |  | $d_6=9.0$ | 1.6204 | 60.29 |
|  | $r_{11}=-52.33$ |  |  |  |
| $L_{VII}$ |  | $d_7=1.3$ | 1.6645 | 35.88 |
|  | $r_{12}=+26.607$ |  |  |  |

$f$ Objective = 150 units of length.
$f$ Eyepiece = 18.7 units of length.

I claim:

In an optical system for use in direct vision telescopes without image inverting glass prisms and in binoculars having surface mirror image erecting systems located between an objective and a collective wide-angle eyepiece covering a subjective angular field of at least 50° said eyepiece being of the well known form comprising two collective outer cemented doublet components standing on either side of a collective simple lens or lens component, the said objective consisting of two single lenses of opposite refractive power separated by an air space, the dispersive lens of which being bent into meniscus form convex towards the object side and located on the object side in front of the collective lens, and said air space being of the form of a meniscus-shaped air lens turning its concave side towards the image side and having an axial thickness between 3% and 10% of the objective focal length, the Abbe-$\nu$ number of the glass of said dispersive lens being chosen for an amount of at least 20 lower than that of the glass of said collective lens in order to produce a negative chromatic difference of magnification for compensating, in the absence of any image inverting glass prism between eyepiece and objective, for the chromatic difference of magnification caused by said collective wide-angle eyepiece.

References Cited in the file of this patent
UNITED STATES PATENTS

| 2,419,151 | Miles | Apr. 15, 1947 |
| 2,764,064 | Kohler | Sept. 25, 1956 |
| 2,814,969 | Kohler | Dec. 3, 1957 |
| 2,889,745 | Hayes et al. | June 9, 1959 |

FOREIGN PATENTS

| 409,465 | Great Britain | May 3, 1934 |